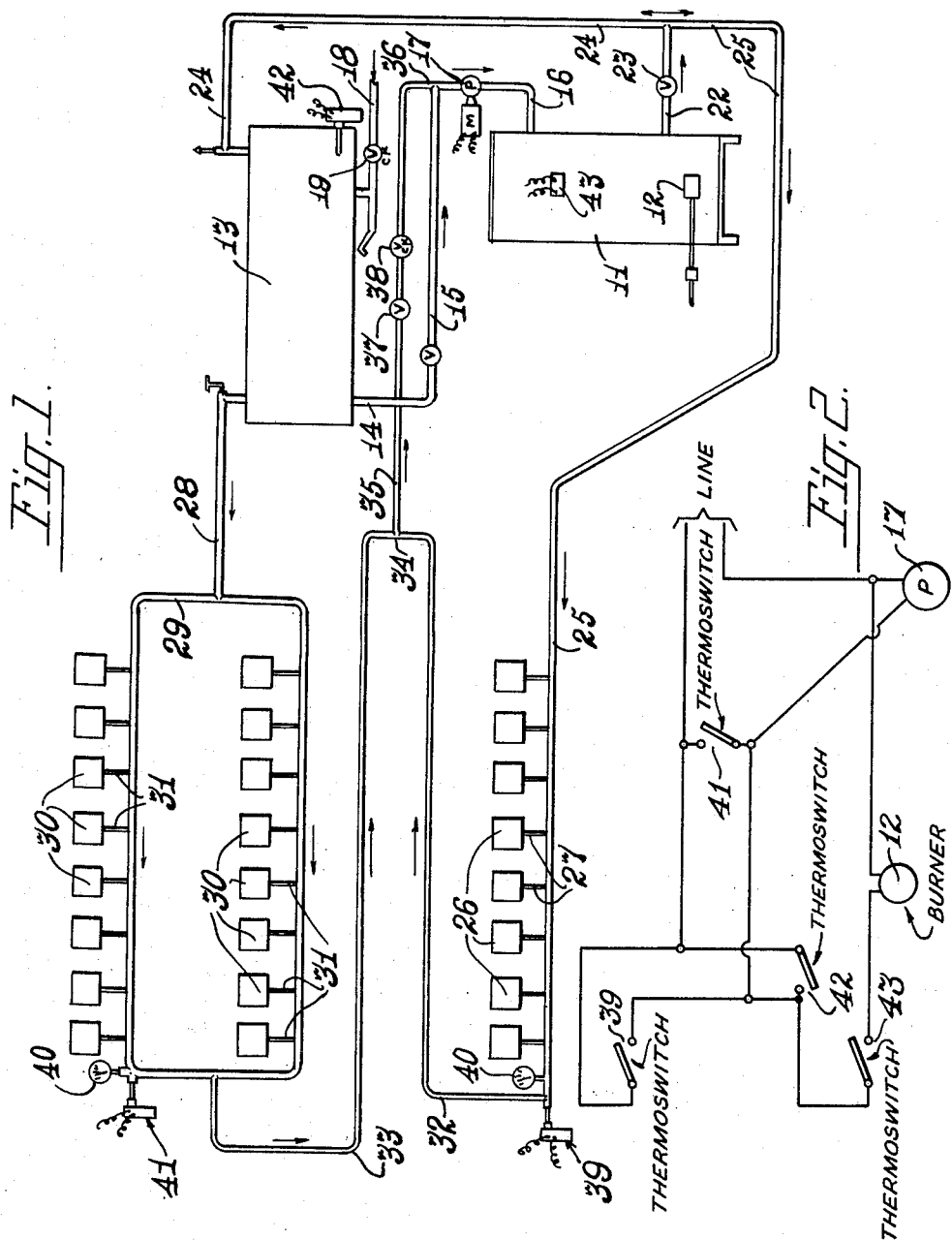

United States Patent Office 3,123,065
Patented Mar. 3, 1964

3,123,065
WATER TEMPERATURE CONTROL SYSTEM
Charles Paul Conley, Palatine, Ill., assignor to Ald Inc., Chicago, Ill., a corporation of Delaware
Filed Apr. 18, 1960, Ser. No. 23,091
5 Claims. (Cl. 126—362)

This invention relates to water heating systems and is more particularly concerned with the method of and means for the automatic control of water temperature in a hot water supply conduit at locations remote from the hot water supply source.

Commercial water heating systems of a kind used to heat and to supply heated water to appliances, such as automatic washing machines, located in a remote position from that of the heater or hot water storage tank fail to function properly, owing to loss of heat in the water by radiation or conduction. In known prior installations there is no provision for the continuous flow of the heated water through the system, consequently, the intended temperature of the water at the locations of use is not maintained. This occurs because the appliances may be out of service for considerable periods of time and water standing in the hot water conduit leading from the heater or storage tank may cool below the temperature required for efficient operation of the appliances. On resuming operation of one or more of the appliances, this cooled water in the conduit must be initially withdrawn and is wasted, or if used, the cooled water is of such low temperature as to be inadequate in the laundering operation. Also, withdrawal of the cooled water requires its replacement in the water system with water from the main supply source, which must then be heated, thus adding to the cost of operation.

The present invention is concerned with a system that insures maintenance of the temperature of the water in the entire system at the requisite high temperature at all times so that water at such temperature is instantly available for use. This is accomplished, generally, by establishing a closed water conduit system and providing temperature control units at pre-selected locations therein operable in response to small changes in the water temperature to start a circulating pump to recirculate the water in the system through the heater or storage tank, even though none of the appliances connected therewith is in use. This thermostatic control system may be correlated with the control system of the burner or other heat source of the water means, or it may operate entirely independently thereof.

It is therefore an object of the invention to provide a closed hot water circulating system with novel means to cause circulation of hot water therein.

Another object is to provide novel method and means to maintain a predetermined minimum water temperature through the entire length of a distribution system, and particularly at the remote regions thereof.

Another object of the invention is to provide a system of the character described with visual means to ascertain the temperature of the water therein.

Another object is to provide a water circulating system of the character described which is not difficult to install or maintain in service, which is economical in operation and which is highly efficient in use.

With the foregoing and such other objects in view, which will appear as this description proceeds, the invention consists of certain novel features of construction, arrangement and combination of parts hereinafter fully set forth, illustrated in the accompanying drawings, and particularly pointed out in the appended claims, it being understood that various changes in form, proportion, size and minor details of the structure and assembly may be made without departing from the scope and spirit of the invention.

Referring to the accompanying drawings, in which the same characters of reference are employed to identify corresponding parts:

FIGURE 1 is a schematic illustration of a water circulating system embodying features of the invention.

FIGURE 2 is a diagrammatic illustration of the electric circuit of the controls for the system illustrated in FIGURE 1.

Referring to the accompanying drawings the water circulating system includes a water heater 11 which may be of any conventional construction and which includes a heater solenoid 12 operable to start and stop the burner therein. Although but one heater 11 is shown, it should be obvious that if more heaters are required, they can be added and manifolded, without departing from the present invention.

A hot water storage tank 13 is connected with the usual water chamber in heater 11 through a conduit system including pipe lines 14, 15, and 16, the latter having a motor driven pump 17 therein operable to force a flow of water from the tank into the water chamber of the heater. Fresh water from any source is admitted to tank 13 through conduit 18 having therein a check valve 19 to prevent reverse flow.

Water heated in the water chamber or heating coil of heater 11 is flowed therefrom during pump operation through an outlet conduit 22, having a control valve 23 therein, into a conduit 24 in flow communication with tank 13, and into a conduit 25, respectively. The conduit 25 is extended into the area in which one or more appliances 26, requiring water at predetermined minimum temperatures of about 180° F., are located. As shown, such appliances 26, which may be a series of devices using sterile water, are each in flow communication with conduit 25 through feed conduits 27.

A hot water conduit 28 connects the water storage tank 13 with a loop conduit 29 to which other batteries of appliances 30, such as automatic washing machines, are connected, as through the conduits 31. Water flowing through conduits 28-29 is to be maintained at a predetermined minimum temperature of about 140°.

Obviously, were no means provided to maintain periodic circulation of hot water through conduit 25 and loop conduit 29, the water standing therein would lose much of its predetermined minimum temperature during periods when the appliances are idle, thus necessitating the withdrawal of cooled water prior to delivery of water to any one or more of the said appliances should peak efficiency be required.

In order to prevent the lowering of the effective temperature of the water immediately available for use at any one of the appliances 26–30, including those furthest removed from the source of hot water, applicant has devised a novel system of return flow and automatic controls operable to cause re-circulation of the water through the system when the water temperature in conduits 25 and 29, and particularly at the remote ends thereof, drops below a predetermined minimum temperature.

To this end, a return flow conduit 32 is connected to the remote end of conduit 25 and a similar return flow conduit 33 is connected to the remote end of loop conduit 29. These return flow conduits preferably merge, as at 34, into a single return flow conduit 35 that is connected, as at 36, to conduit 16. Thus, any water flowing through conduits 32 or 33 into conduit 35 is in flow communication with water contained in conduit 16. A gate valve 37 preferably is provided in return conduit 35 to control the return flow, and a check valve 38 prevents back flow in the said conduit 35.

Recirculation of water through the return system described in the next preceding paragraph is dependent upon operation of pump 17. Consequently, a normally open thermostat control switch unit 39 is installed at the juncture of conduit 25 with return flow conduit 32 and another normally open thermostat control switch unit 41 is installed in the remote end of loop conduit 29. Also, visual temperature gauges 40 may be installed at these points in the system. The switch units 39–41 are connected in the electric circuit (see FIGURE 2) to pump 17 so that when either one or both switch units are actuated in response to a predetermined low water temperature in the respective conduits, the pump circuit is closed to start operation of the pump. When the temperature in the region of either switch unit again reaches its predetermined minimum temperature, the respective switch unit 39 or 41 responds thereto and when both are returned to open condition, the pump stops operation. This cycle of pump operation and stoppage will continue as long as the heating system is maintained in operative condition to maintain a supply of hot water.

The electric circuit to pump 17 also includes a normally open thermostat control switch unit 42 mounted in the tank 13 and operable to close the electric circuit to the pump when the water temperature in the tank 13 reaches a predetermined low. In the present disclosure, the water chamber within the heater 11 also includes a normally closed high limit safety control switch 43 which is connected in the electric circuit to gas solenoid 12. Thus, when the water in tank 13 or at the remote ends of conduits 25–29, or either of them, requires heating, the requisite control switches 39, 41, and/or 42 are actuated to operate the pump. Also, when heat is called for by the temperature of the water in the tank 13 or at the remote end of high temperature hot water conduit 25, when the temperature therein reaches a predetermined low, the closing of the control switches 39 and/or 42 operates to start the burner 12. The system is therefore such that a predetermined minimum water temperature is maintained in the entire system at all times so as to make available, for instant use in the appliances, water of the required high temperature without water or fuel waste, or a waste of time.

As many possible embodiments of the invention may be made, and as many changes might be made in the embodiments above set forth, it is to be understood that all matters hereinbefore set forth or shown in the accompanying drawings are to be interpreted as illustrative only and not in a limiting sense.

Having thus described the invention, what is claimed as new and desired to be secured by Letters Patent of the United States is the following:

1. A water heating system adapted to deliver heated water at predetermined temperatures which comprises a hot water storage tank adapted to contain heated water at a predetermined temperature, a heater to heat the said water, conduit means connecting the heater and tank to deliver heated water to the said tank, separate conduit means to deliver heated water from the said tank and from the said heater to separate points of use located remote from the said tank and heater, a return flow conduit in flow communication with the remote ends of the said last named conduit means and with the heater, a motor driven pump in the said return flow conduit, normally open thermostat control switch unit at the remote end of each of said last named conduit means, said units being responsive to different water temperatures, and a normally open electric circuit connecting the said switch units and pump motor adapted to be closed by the closing of either of said switch units when the temperature of the water at either of said remote ends reaches a predetermined low to start the said pump.

2. A water heating system adapted to deliver heated water at predetermined temperatures which comprises a hot water storage tank adapted to contain heated water at a predetermined temperature, a heater to heat the said water, an electrically controlled burner for supplying heat to said heater, first conduit means to deliver heated water from the said heater to the said tank and to points of use located remote from the said tank and heater, second conduit means to deliver heated water from said heater to other points of use remote from said heater, a return conduit in flow communication with the remote ends of said first and second conduit means and with the heater, a motor driven pump in said return conduit, a normally open thermostat control switch unit at the remote end of each of said conduit means, said units being responsive to different water temperatures, a normally open electric circuit connecting the said switch units and pump motor adapted to be closed by either of said switch units when the temperature of the water at the either of said remote ends reaches a predetermined low to start the pump, and means operable in response to the temperature of the water in the tank and on the heater to open and close an electric control circuit to the said burner.

3. A water heating system adapted to maintain different predetermined minimum water temperatures at different portions of the said system which comprises a heater to heat water to a predetermined high temperature, first conduit means to deliver heated water from the heater to a first appliance located remote from the heater, a water storage tank, conduit means to deliver heated water to the tank from the heater and to return water to the heater from the tank, a second conduit means to deliver heated water from the tank to a second appliance located remote from the tank, a pump in the return flow conduit from the tank to the heater, a single return flow conduit connecting the remote ends of said first and second conduit means with said return flow conduit on the low pressure side of said pump, an electric motor to operate the said pump, a normally open electric circuit connecting the said motor with a source of electric current, and normally open thermostat control switches each responsive to different water temperature mounted one at the remote end of each of said first and second conduits and in the tank each operable independently of one another to close the electric circuit to the pump motor when the temperature of water at either remote end or in the tank reaches a predetermined low, so as to circulate heated water through either or both of said first and second conduit means.

4. A water heating system adapted to maintain different predetermined minimum water temperatures at different portions of the said system which comprises a water heater, a burner in the said heater operable to heat water to a predetermined high temperature, first conduit means to deliver heated water from the heater to an appliance located remote from the heater, a water storage tank, a conduit to deliver heated water to the tank from the heater and a return flow conduit to return water to the heater from the tank, second conduit means to deliver heated water from the tank to an appliance located remote from the tank, a pump in the return flow conduit from the tank to the heater, a single return flow conduit connecting the remote ends of said first and second conduit means with the said return flow conduit on the low pressure side of the said pump, an electric motor to operate the said pump, a normally open electric circuit connecting the said motor with a source of electric current, and normally open thermostat control switches each responsive to different water temperatures mounted one at the remote end of each of said first and second conduits and in the tank each operable to close the electric circuit to the pump motor when the temperature of water at either remote end or in the tank reaches a predetermined low, at least two of said control switches being operable to start the burner.

5. A combined hot water supply and heating system comprising a water containing boiler with means for heating the water therein to a relatively high temperature, a tank, a connection from the boiler to said tank, a return conduit from the tank to the boiler, an electrically driven pump in the return conduit from the tank to the boiler whereby there is provided a flow of water between the boiler and tank, a hot water exit from said tank to an appliance, a return flow conduit from said appliance to said pump whereby there is provided a closed circuit flow of water between the tank and the appliance and back to the pump, a second appliance, a conduit connecting the boiler with said second appliance, a return flow conduit connecting said second appliance with the pump, a thermostatic controlled switch in each of the return conduits from the appliances, said switches each being responsive to different water temperatures and being independently operable to close the electric circuit to the pump when the water in proximity with the respective switch reaches a predetermined low temperature, and a thermostatic switch in the tank operable to actuate the pump when the water in the tank reaches a predetermined low temperature.

References Cited in the file of this patent

UNITED STATES PATENTS

| | | |
|---|---|---|
| 1,768,992 | Martin | July 1, 1930 |
| 1,780,379 | Durdin | Nov. 4, 1930 |
| 1,843,566 | Lake | Feb. 2, 1932 |
| 2,545,206 | Main | Mar. 13, 1951 |
| 2,591,400 | Burklin | Apr. 1, 1952 |
| 2,668,664 | Williams | Feb. 9, 1954 |
| 2,781,174 | Smith | Feb. 12, 1957 |
| 2,852,018 | Williams | Sept. 16, 1958 |
| 2,952,410 | MacKay | Sept. 13, 1960 |